United States Patent [19]

Fenech

[11] Patent Number: 4,860,597

[45] Date of Patent: Aug. 29, 1989

[54] BELT TENSION TESTER

[75] Inventor: Anthony J. Fenech, Flat Rock, Mich.

[73] Assignee: Chrysler Motors Corporation, Highland Park, Mich.

[21] Appl. No.: 264,923

[22] Filed: Oct. 31, 1988

[51] Int. Cl.[4] .............................................. G01L 5/04
[52] U.S. Cl. ................................ 73/862.45; 73/862.48
[58] Field of Search ........... 73/862.45, 862.47, 862.48, 73/852

[56] References Cited

U.S. PATENT DOCUMENTS

| | | |
|---|---|---|
| 2,528,883 | 11/1950 | Hayward . |
| 2,996,914 | 8/1961 | Delehanty . |
| 3,352,153 | 11/1967 | Hoawrd . |
| 3,564,913 | 2/1971 | Evans et al. . |
| 3,596,508 | 8/1971 | Howard . |
| 3,720,100 | 3/1973 | Grunbaum . |
| 3,943,761 | 3/1976 | Shoberg et al. ................. 73/862.48 |
| 4,077,256 | 3/1978 | Hollander . |
| 4,444,065 | 4/1984 | Okamuro . |

*Primary Examiner*—Charles A. Ruehl
*Attorney, Agent, or Firm*—Kenneth H. MacLean, Jr.

[57] ABSTRACT

The belt tension measuring device includes an enclosure supporting a movable load cell therein, the load cell being connected at one end to a belt contacting member and at the other end to a manually activated handle means so that the contact member can be moved against the belt thereby generating a force on the load cell. The activation means includes a reciprocally movable shaft which is cooperative with a catch member to latch the shaft into an tension measuring position whereby the contact member is moved a predetermined distance while pressing against the belt.

9 Claims, 1 Drawing Sheet

BELT TENSION TESTER

BACKGROUND OF THE INVENTION

There has long been a need for an accurate and easily usable tension tester for drive belts and the like, particularly in the vehicle manufacturing industry. Belts have been extensively used on vehicle engines to power accessory devices such as alternators, air conditioning compressors and power steering pumps. With the more common use of overhead cam systems, belts have been used to rotate the cam. In all of these applications, it is important that the belts be tensioned correctly. If the belt is too loose, it will slip and maybe make an undesirable noise. If the belt is too tight, its durability will be decreased and excessive stress will be exerted on the associated bearings.

An example of a previous patent on a belt tension gauge is U.S. Pat. No. 4,444,065 to Okamuro. This gauge has a manual handle type activator which is moved against a lever arrangement to cause a member to press downward against a belt. A mechanical gear and rack type of gauge is disclosed in the Okamuro patent.

A second patent on a belt tension gauge is found in U.S. Pat. No. 2,996,914 to Delehanty. The Delehanty patent discloses a tester much like the Okamuro device described above. However, instead of pressing downward on the belt, this device pulls the belt upward toward the tester. The read-out gauges in the two patents are similar.

The following three patents were uncovered which relate to belt tension measuring devices. The U.S. Pat. Nos. are: 3,352,153 to Howard; 3,596,508 to Howard and 3,564,913 to Evans. et al.

The following three patent were uncovered which relate to tension measuring devices for other devices than belts and the like. The U.S. Pat. Nos. are: 2,528,883 to Hayward for measuring the weight on a drilling bit; 3,720,100 to Grunbaum for measuring the tension of filaments or the like; 4,077,256 to Hollander for measuring the tension of a stringed racket.

SUMMARY OF THE INVENTION

As indicated, an accurate, easily used and relatively inexpensive device for testing belt tensioning on vehicle engines is desirable. The subject belt tension test device meets these objects. The device utilizes a load cell responsive to a force thereon to produce an output. Resultantly, an electrical signal is generated by the load cell which can then be conveniently displayed. The device is very accurate, uncomplicated and is relatively reliable.

The subject tension testing device utilizes a movable load cell loosely supported in a housing so that a manually applied force produces a predetermined displacement of the cell relative to a belt. This produces a lateral displacement of the belt and a corresponding force on the cell which can be read. The predetermined displacement of the cell relative to the belt is manually applied and the displacement is produced by a mechanism including a handle and a shaft attached to the load cell. Further, the testing device provides a selectively releasable catch means which is cooperative with detent means of the shaft to secure the shaft in the predetermined displacement. Simultaneously, the load cell generates and output which may be displayed.

The subject tension tester has further advantageous features and objects which will be even more apparent after a reading of the following detailed description of an embodiment of the invention, reference being had to drawings of a specific embodiment as described below.

IN THE DRAWINGS

FIG. 1 is a somewhat schematic view of a typical accessory drive in a vehicle engine and the subject tension testing device; and FIG. 2 is a partially sectioned elevational view of the belt tension testing device shown in FIG. 1 and in a pretest operative position; and FIG. 3 is an enlarged sectioned view of the manual activation upper portion of the testing device taken along section line 3—3 in FIG. 2 and looking in the direction of the arrows; and FIG. 4 is a sectioned view taken along section line 4—4 in FIG. 2 and looking in the direction of the arrows; and FIG. 5 is a fragmentary view from the perspective of arrow 5 in FIG. 2.

DESCRIPTION OF A PREFERRED EMBODIMENT

Figure 1:
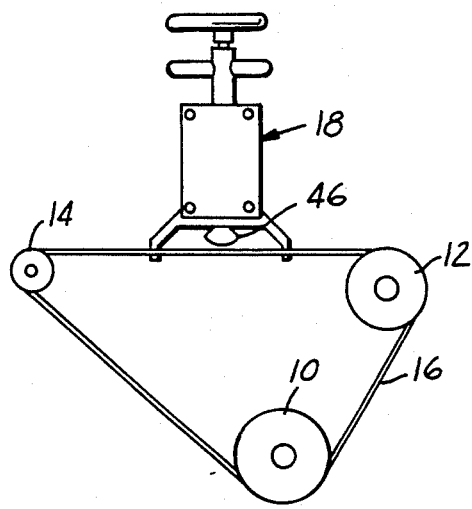

A typical vehicle engine accessory drive is shown in FIG. 1. A pulley 10 is attached to the forward end of the engine crankshaft and is operatively connected to rotate a pulley 12 attached to the end of a coolant pump shaft. A third pulley 14 is attached to the end of a generator or alternator shaft. The pulleys 10-14 are connected for rotation together by a belt 16. This belt 16 can be a common V-belt or a toothed flat type of belt currently gaining favor.

In FIG. 1, the subject belt tension testing or measuring device 18 is shown in a pre-test position relative to belt 16. Details of the device 18 are better shown in FIG. 2. The tester has a frame which includes upper and lower wall portions 20, 22 and side wall portions 24, 26. A rear wall portion 28 and a removable front cover portion 30 complete the frame. The members 20-30 enclose an interior space 32. The side walls have interior surfaces 34, 36 which are parallel to each other. Fasteners 38 connect the front cover portion 30 to the other portions.

The interior space 32 of the device 18 supports a load cell 40 therein. The cell 40 has a rectangular configuration and its side surfaces 42, 44 are located in sliding relation to the surfaces 34, 36 of the side walls 24 and 26. Thus, the load cell 40 can be moved in the interior 32 parallel to the side walls 24, 26. The cell 40 is shown in an upward pre-test position in FIG. 2. During testing, the cell 40 is moved downward toward the lower wall 22 as will be better explained hereinafter. A belt contactor 46 is located beneath the lower wall 22 and is operatively connected to the load cell 40 by a member 48. Member 48 extends through an opening in the lower wall portion and is threaded into the load cell 40 at an upper end and into the contactor 46 at a lower end. Resultantly, the cell 40 and contactor 46 move as one. The contactor 46 has a curved lower surface 50 which is adapted to engage the top surface 52 of the belt 16.

Figure 4:
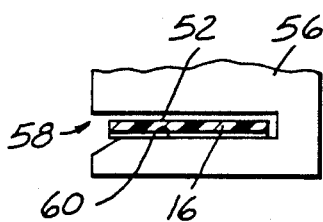

The frame also includes a pair of depending arms 54 and 56 extending from the lower wall portion 22. The lower portions of each arm has a slot 58 formed therein adapted to accept the belt 16. As shown in FIG. 4, a surface 60 of the slot engages the belt 16 to support it as the contactor 46 is pressed against the top surface of the belt 16 during the test measurement.

Figure 2:
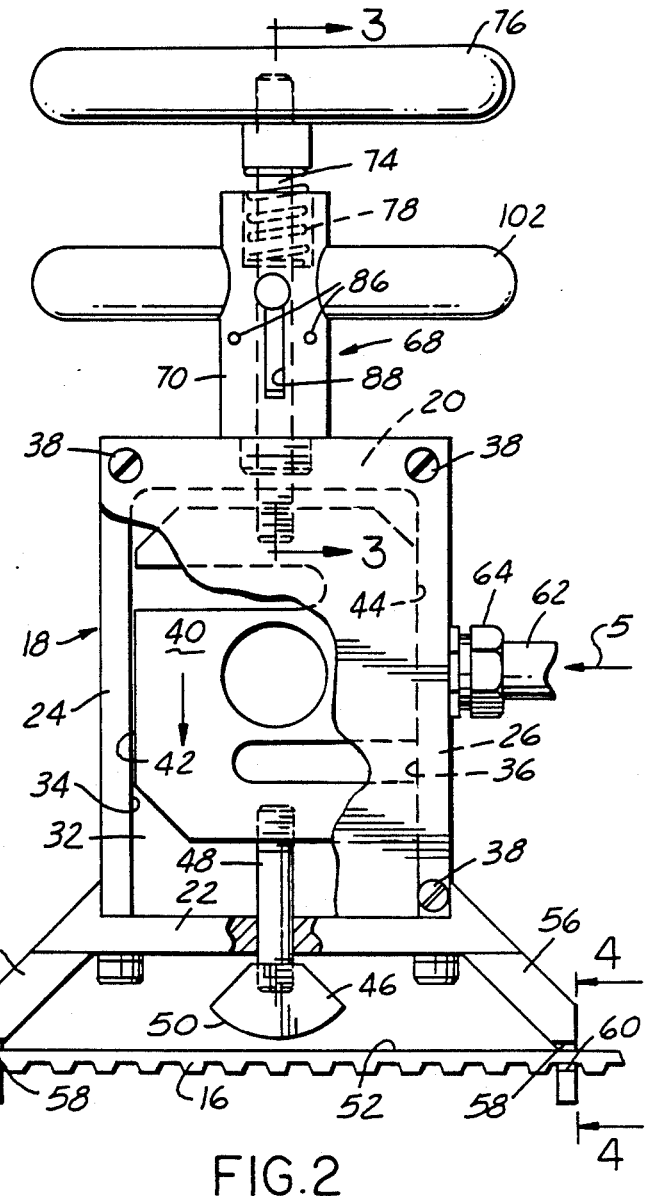
Figure 5:
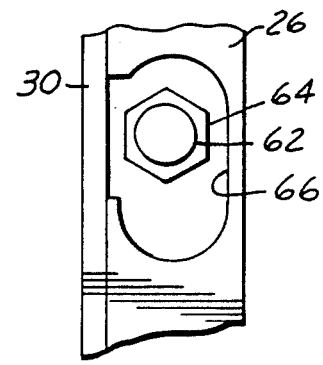

Thus, it can be understood that to measure and test the tension of the belt, the cell 40 is moved downward from the position shown in FIG. 2. This forces the contactor 46 to press against belt 16. The load cell 40 is commercially available and is manufactured by G.S.E., Inc. The cell senses forces applied across its upper and lower ends. Thus, as the contactor presses against the belt, a force is applied to the load cell. The cell generates an electrical signal output proportional to the force applied thereto. The cell output is transmitted by a cable 62 which enters the cell 40 through a fitting 64 on the side 44 of the cell as shown in FIG. 2. The cable 62 and fitting 64 extend through an elongated opening 66 in the side wall portion 26 of the frame as best shown in FIG. 5. The elongated opening 66 permits adequate movement of the cell in the frame for the test.

Figure 3:
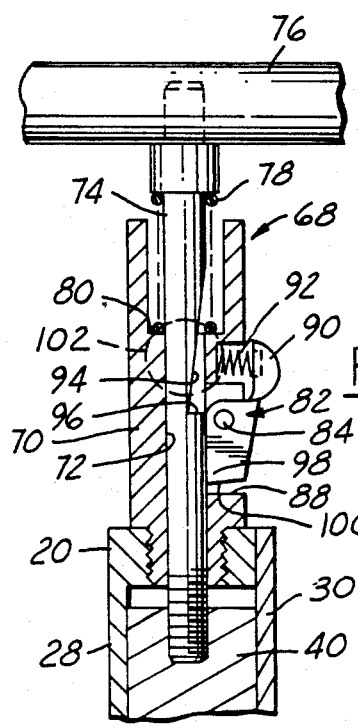

The cell 40 and contactor 46 are moved manually from the illustrated upward pre-test position in FIG. 2 to a more downward test position. In every test measurement, the cell and contactor are moved the same predetermined distance downward. An actuator assembly 68 extends from the upper wall portion of the frame. As best shown in FIG. 3, a body 70 with an axially extending bore 72 is threadably attached to the frame's upper wall. A shaft 74 extends through the bore 72 of the body 70 and is threadably fastened to the upper portion of the load cell 40. The upper end of the shaft 74 is press fit into a laterally extending handle 76. By pressing down on the handle, the load cell and the contactor are moved downward into the test position.

A light coil type spring 78 is located between the handle 76 and the body 70 to urge the shaft, cell and contactor to the pre-test position. Specifically, the lower end of the spring 78 engages a shoulder 80 formed in the upper end of the body 70 by a counterbore. A catch means and a detent forming means are shown in FIG. 3 for determining the predetermined downward movement of the cell and contactor and holding the shaft in the test position until released. Specifically, the catch means includes a lever 82. Lever 82 is pivotally supported by a pin 84 which extends through a hole 86 in the body 70 and a similar hole through the midportion of lever 82. The lever 82 is mounted in a channel 88 in the body 70. An upper end portion of the lever 82 is formed with a rounded button portion 90 which overlies a light coil spring 92 urging the lever clockwise in FIG. 3. The previously mentioned detent forming portion is in the form of a cut or depression 94 in the shaft 74 and includes shoulder surface 96. When the handle is manually pushed downward and the shaft moves downward sufficiently, a lower end 98 of lever 82 will be allowed to move to the left in FIG. 3. This causes an end surface 100 of lever 82 to engage shoulder surface 96 of the shaft 74. Resultantly, the shaft is secured in the downward test position as the tension measurement is made. When the test is completed, button 90 is pressed and the lever 82 is pivoted counterclockwise causing lower end surface 100 to disengage from the shoulder surface 96. Consequently, the contactor 46, cell 40, shaft 74 and handle 76 are then urged upward by spring 78 to the pretest position.

One further feature of the tester is illustrated in FIG. 2. A stationary handle 102 extends laterally from the body 70 for providing a grip for the above described manual operation of the movable handle 76. By this means, an operator of the test may conveniently apply the required downward force on the handle 76 while stabilizing the hand on the stationary handle 102.

Although the preceding detailed description of the testing device and the test procedure is directed specifically to only one embodiment of a test device, the invention is not necessarily limited to this specific embodiment as shown and described, since the claims define the invention. It should be understood that the specific embodiment of the invention is subject to modifications which do not necessarily fall outside the scope of the following claims which define the invention.

I claim:

1. A gauge for measuring the tension of an elongated flexible belt element, comprising: frame means defining a hollow interior and having spaced side wall portions, upper and lower end wall portions and front and rear walls; a load cell in the hollow interior, the load cell being supported between the side wall portions and so configured to permit the cell to be moved between the upper and lower wall portions; a belt contact member being operatively attached to and movable with the load cell and positioned adjacent the lower wall portion of the frame means; a pair of arms extending from the lower wall portion of the frame means for engaging and supporting the belt at spaced intervals on either side of the contact member; means including a shaft attached to the load cell and extending outward from the upper wall portion of the frame for manually moving the load cell and its attached belt contact member from a first position out of contact with the belt to a second position contacting the belt, thus subjecting the load cell to a force; a releasable catch means and a shaft detent means operative to capture the downward second position of the shaft.

2. A gauge for measuring the tension of an elongated flexible belt element, comprising: a frame defining a substantially hollow enclosure and having spaced side wall portions, upper and lower wall portions and front and rear walls; a load cell within the hollow interior of the frame, the load cell being supported between the spaced side wall portions and guided as it is moved in the interior between a first position nearer the upper wall portion and a second position nearer the lower wall portion; a belt contact member operatively attached to the load cell and positioned outwardly from the lower wall portion so that it is moved against one side of the belt as the load cell is moved form the first position to the second position; a pair of arms extending outwardly from the lower wall portion and into engagement with the belt at a spaced interval on either side of the contact member, the arms including end portions contacting the opposite side of the belt from the one side thereby supporting the belt as the contact member bears against it; activation means to manually move the load cell from the first to the second position and thereby move the contact member against the belt; the activation means including a shaft extending through the upper wall portion of the frame and being attached at a lower end to the load cell; a handle means at the upper end of the shaft; a releasable catch means supported adjacent the mid-portion of the shaft; shoulder forming means of the shaft for engagement with the catch means when the shaft moves to the second position whereby the shaft is held in the second position until manually released.

3. The tension measuring gauge set forth in claim 2 in which the shoulder forming means of the shaft is provided by removing material from the shaft.

4. The tension measuring gauge set forth in claim 2 in which the catch means is in the form of a lever, the lower end of which is configured to provide an engagement surface with the shoulder means, the upper end of which is configured so that it projects laterally outward from the body so that it may be depressed causing the lever to pivot to a release position disengaging the lever from the shoulder means.

5. The tension measuring gauge set forth in claim 2 in which the load cell has output means extending outward therefrom and the frame has an elongated aperture therethrough positioned to permit extension of the output means therethrough which then allows the load cell to move in the enclosure without interference.

6. A gauge to measure the tension of an elongated flexible belt element, comprising: a frame defining a hollow enclosure and having spaced side wall portions, upper and lower wall portions and front and rear walls; a load cell in the enclosure and being so configured that the side wall portions of the frame guide movement of the load cell between a first position near the upper wall portion and a second position near the lower wall portion; a belt contact member operatively attached to the load cell and outwardly positioned from the lower wall portion so that it is moved against one side of the belt as the load cell moves from the first position to the second position; a pair of arms extending outwardly from the lower wall portion for engagement with the belt at a spaced interval on either side of the contact member, each arm including an end portion with a slot formation to receive the belt therein for supporting the belt against movement away from the frame as the contact member bears against the belt; activation means to manually move the cell from the first position to the second position, the means including an elongated body attached to the upper wall portion and extending outwardly therefrom; the elongated body having a bore therethrough extending in parallelism with the frame's side walls; an elongated shaft extending through the bore of the body and being attached to the load cell at a lower end, the upper end of the shaft projecting from the body so that the shaft can be reciprocated in the body to cause the load cell to move in the enclosure; a channel formed in the body parallel to the shaft; a lever in the channel with upper and lower ends, the lever being pivotally supported relative to the body so that the ends thereof move radially relative to the shaft; the shaft having a shoulder portion adapted to be engaged by the lower end of the lever when the shaft is moved to the second position thereby securing the shaft in the second position until released; means urging the lever in to the shoulder engaging position but being yieldable to disengage the lever when the upper end portion is manually activated.

7. The tension measuring gauge set forth in claim 6 in which a spring urges the shaft toward the first position.

8. The tension measuring gauge set forth in claim 6 in which a handle is attached on the outwardly projecting end of the shaft.

9. The tension measuring gauge set forth in claim 8 in which a second handle is attached to the body and being spaced closely to the first handle so that both handles can be gripped together as the first handle moves the shaft and load cell to the second position.

* * * * *